X 8277
C. H. McCORMICK.
REAPER.
Patented June 21, 1834.
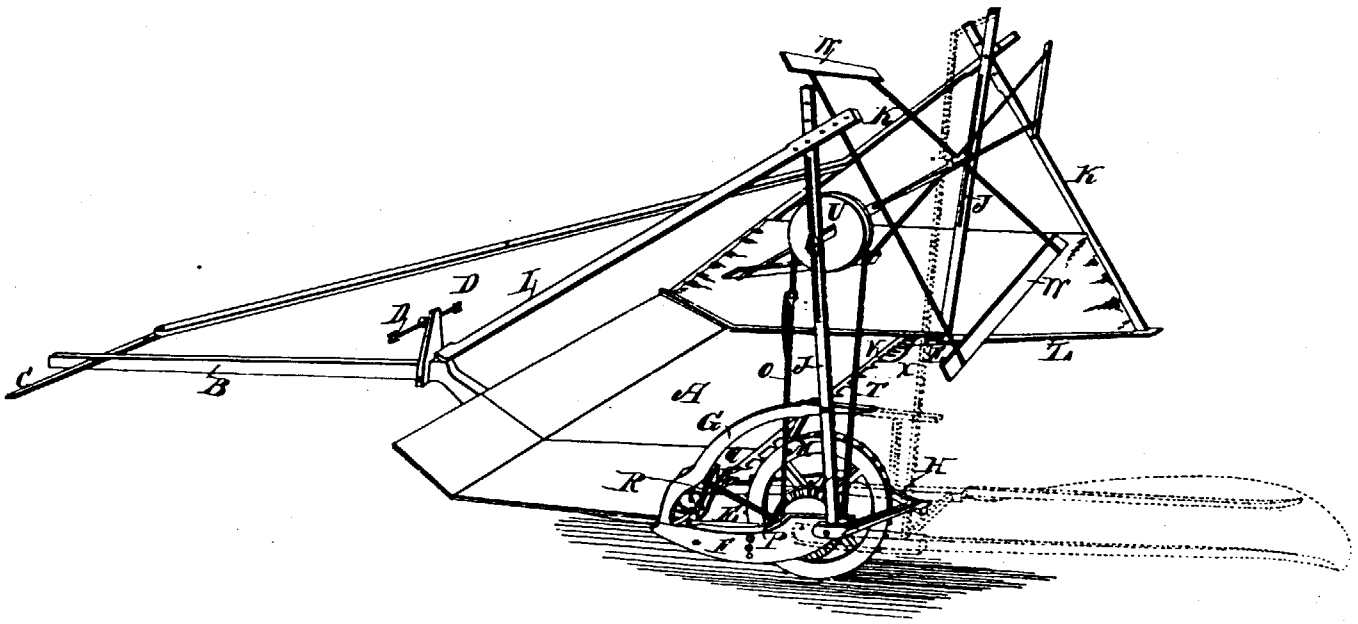

X8277

UNITED STATES PATENT OFFICE.

CYRUS H. McCORMICK, OF ROCKBRIDGE COUNTY, VIRGINIA.

IMPROVEMENT IN MACHINES FOR REAPING SMALL GRAIN.

Specification forming part of Letters Patent dated June 21, 1834

*To all whom it may concern:*

Be it known that I, CYRUS H. McCORMICK, of Rockbridge county and State of Virginia, have invented a new and useful Improvement in Reaping all Kinds of Small Grain; and I do hereby declare that the following is a full and exact description of the construction and operation of the said machine as invented or improved by me.

Upon a frame of wood is to be constructed a platform of about six feet in width by about four or five in length. From the back of this platform projects a tongue of about ten or eleven feet, to the end of which is secured a cross-bar to attach the single-trees, by which the horses pull with their heads directed toward the platform, near which at a proportionate distance from the cross-bar are fastened to an upright rising from the tongue two hooks by staples to said upright, one projecting toward each horse. These hooks fasten into the hame-hook of each horse, though the machine will be found to work better by using the hook to the left horse, the one ridden by the boy directing their movements. One horse may work the machine from this side by substituting shafts for the tongue. On the right hand of the platform are to project in front two pieces of the frame about one and a quarter foot, and about one foot apart. On each outside of this projection is to be secured a broad piece of wood by a screw-bolt passing through it and the projection of the frame. From the end of this broad piece nearest the platform rises a circular brace projecting forward and secured to the reel-post by a movable screw-bolt, to allow of advancing or drawing back as the adjustment of the cutting may require. About three-quarters of a foot on the other end is a movable screw-bolt passing through both pieces, also allowing for a rise or fall in adjusting the height of cutting, and at about the same distance farther on is to play an axis of a wheel to be hung between said pieces. At a short distance in front of this axis are to be secured an arm on each side projecting toward the middle, where they are united and serve to throw the stalks of the grain toward the cutting apparatus. This triangle is to be movable on its screw also, and it may be removed altogether for the purpose of inserting shafts, so that the machine may be drawn by one horse in this manner. The two head-pieces are to be lengthened, as also the curved brace projecting toward all of them, about three or four feet. The two broad pieces will be connected at their ends by a bar for the single-tree, and, rising from the right-hand one near the end, an upright connects it with the curved brace, and by the side of this upright rises another, secured to its place to a height sufficient to clear the reel. From this top a brace passes across the reel to the opposite post. Below the inner shaft from the single-tree end is secured a long bow or brace projecting outward somewhat and continuing along the direction of the shaft to the front of the horse, where it passes round and joins to the other shaft, which has been left purposely longer. The object of this bow is to throw the stalks inward toward the cutting apparatus, instead of the triangle removed. Some other braces may be used to strengthen this part of the machine similar to one which must pass from the junction of the curved brace with the reel-post obliquely toward that end of the opposite head-piece nearest the front of the cutter. From the top of the reel-post a brace will also pass to the foot of the upright projection on the tongue. On the opposite side of the machine is another reel-post rising from a projection of the platform and supported by a brace on each side connected to the top by a movable screw-bolt, and extending one to the end of a piece attached to the projection, on the outside of which piece, and rising in the same direction, may be secured a bow, in order to more effectually divide the grain before it comes to the reel from the platform by a movable screw, and extending forward about six feet, serving to regulate the width of the swarth; the other brace to the end of the platform next the horses, where, about half-way up, it is joined by another brace, continuing it onto the cross-bar at the draft end of the tongue. This end of the platform is to be closed by a strip of cloth stretched along it, and as high as the stalks. The tongue is to be supported by the horses by means of a pole passing across their backs between them, and resting on pad-saddles. From this pole a chain passes to the tongue below and suspends it to the desired height. On the axis hung between the head-pieces is a wheel of about two feet diameter, having the circumference armed with teeth to hold to the ground by. On the right of this wheel is another of about thirteen inches diameter, or containing thirty teeth on the same axis, having a width on the circumference for the reception of a band; and on the right side are to be the teeth or cogs working in a smaller cog-wheel of about three and a half inches in diameter, or nine cogs, secured to an axle sloping back toward the front of the platform, where is secured another cog-wheel of about eleven inches in diameter, or containing twenty seven teeth, working into another of about three and a half inches in diameter, or nine cogs, attached to an upright double crank passing from the curved brace down to the broad piece below. These cranks are in a right line, projecting on opposite sides of the axis, and in a line with the front edge of the platform. To the lower of these cranks is attached, by a joint near the crank, having a wooden pin, a long cutter of steel, grooved or notched on its lower edge like a reaping-hook, with the grooves running in a line toward the right of the machine. This blade is attached to the frame-piece below the edge of the front of the platform by movable tongues on slips of metal, the bolt securing it to said frame-piece acting as a pivot, and that through the blade likewise, so that the motion is described in part of a circle. This motion, when the stalks are presented, cuts them through. Above this cutter slides another long plate to the upper crank of the same length, and secured in the same manner; but instead of the fine teeth used in the lower plate these teeth are long—say about one and a half inch, and about the same distance apart. They are to project in a line sloped in an opposite direction to the grooves in the cutters below, and their motion in sliding backward and forward is also contrary, thereby collecting the stalks as they come in contact with these teeth and force them across the teeth in the cutter below, thereby greatly assisting in the act of cutting them through. The crank working this blade may be dispensed with in some cases, and the teeth made fast above the cutter and bent over its edge and under some distance, so that the cutter will then work against them and produce the same effect.

On the upper end of each reel-post is a groove or long mortise, having a number of holes through to the sides for the reception of an adjusting-pin. On this pin and through the groove works the end of the axis of the reel, having on the right end a pulley of about twelve inches diameter secured to the axis, and worked by means of a belt from the pulley-wheel below on the axle of the wheel working in the ground.

The reel is composed of two or more cross-arms at each end of the axle, projecting about three feet, and connected at their ends by a thin band of about six inches in width, which, by the arrangement of the arms, runs in somewhat a spiral direction along the axis, though it might be parallel, the right end bearing up first upon the grain. This reel, by the motion given by the strap as the horses advance, bears the stalks as they are projected inward by each end of the termination of the platform upon the cutter, and when separated lands them on the platform, which, advancing till sufficient quantity is collected, is discharged as often as may be required by a hand with a rake at the right end of the platform. On the left end of the platform is a wheel of about fifteen inches diameter set obliquely, bending under the platform to avoid breaking down the stalks on an axle, that may be raised or lowered by two movable bolts, as the cutting may require, corresponding with the opposite side. The projection of the frame at this end is made sufficiently wide to bear off the grain from the wheel.

My claim is for the arrangement of the several parts so as to constitute the above-described machine, and I particularly claim the method of cutting by means of a vibrating blade operated by a crank having the edge either smooth or with teeth, either with stationary wires or pieces above and below, and projecting before it, for the purpose of staying or supporting the grain while cutting or using a double crank, and another blade or vibrating bar, as before described, having projections before the blade or cutter on the upper side, both working in contrary directions, thereby lessening the friction and liability to wear, by dividing the motion necessary for one between the two, and improving the principle of cutting by gathering and holding the grain to the cutter, the projections standing at a proper angle to said cutter; also the method of securing them.

I also claim the method of gathering and bringing the grain back to the cutter and delivering it on the apron or platform by means of a reel, as described above, movable to any height required to suit the grain, and the platform to hold the grain until a sufficient quantity shall have been collected for a sheaf, more or less. Likewise the mode of changing the machine for cutting either high or low, as described above; also the method of dividing and keeping separate the grain to be cut from that to be left standing, and the method of attaching the tongue, when behind, to the breast of the horse, to enable him to guide the machine with accuracy.

In testimony that the above is a true and correct description of the use and construction of my machine as invented by me I have hereunto set my hand this 19th day of June, 1834.

CYRUS H. McCORMICK.

Witnesses:
HENRY STONE,
ROBT. CLARK.